Figure 4:
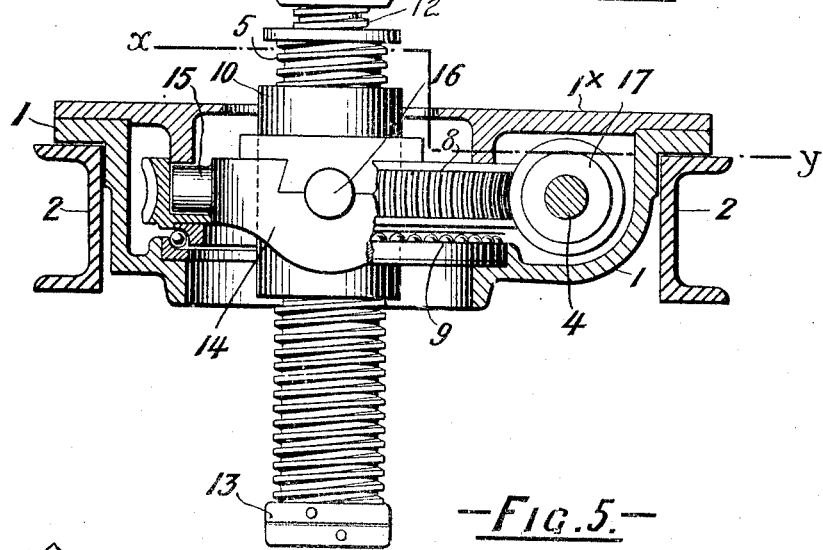

Nov. 24, 1925.
W. BARNETT ET AL
1,562,860
TILTING MECHANISM OF SELF DISCHARGING WAGONS
Filed Feb. 27, 1925    2 Sheets-Sheet 1
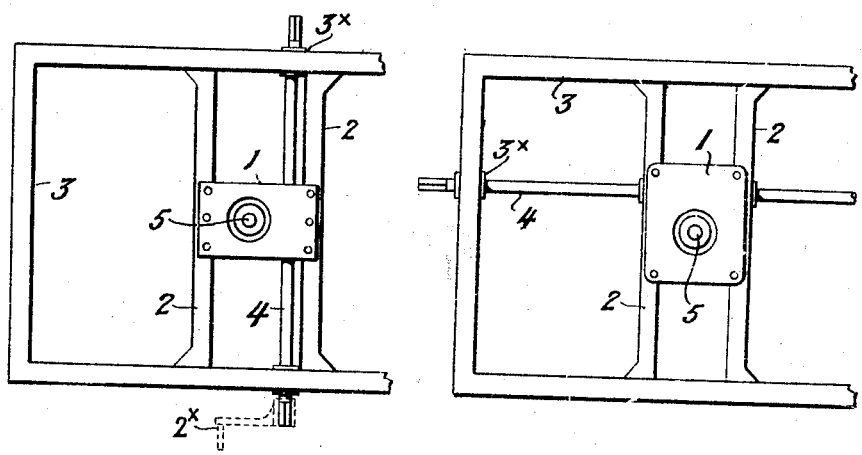
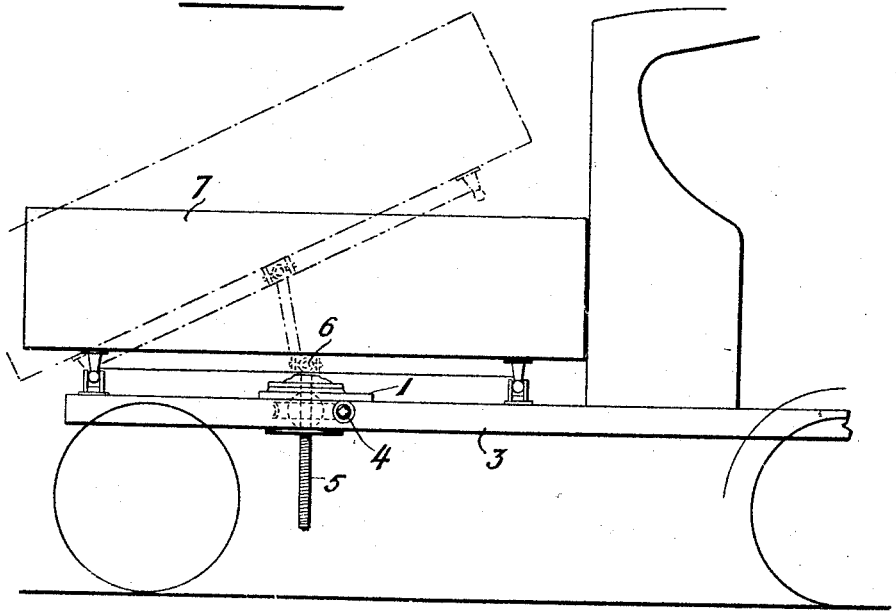

Patented Nov. 24, 1925.

1,562,860

UNITED STATES PATENT OFFICE.

WALTER BARNETT AND JAMES FLORENDINE, OF RUGBY, ENGLAND.

TILTING MECHANISM OF SELF-DISCHARGING WAGONS.

Application filed February 27, 1925. Serial No. 12,015.

*To all whom it may concern:*

Be it known that we, WALTER BARNETT and JAMES FLORENDINE, subjects of the King of Great Britain, residing, respectively, at Bilton Hall, Rugby, Warwickshire, England, and 16 Bridget Street, New Bilton, Rugby, Warwickshire, England, have invented certain new and useful Improvements in Tilting Mechanism of Self-Discharging Wagons, of which the following is a specification.

The present invention relates to tilting mechanism for self-discharging wagons of that known kind in which an angular adjustment of the wagon body relatively to the chassis, either to one side or the other or forward or rearward, can be effected, according to the direction in which the body is permitted to be tilted by its mounting and connection with the chassis, the actual tilting operation being effected by a tilting screw, universally jointed at its upper end to the base of the body and mechanism carried by the chassis of the vehicle by which the tilting screw can be raised or lowered to effect the tilting operation.

Well known mechanism of this kind carried by the chassis and acting on the base of the body has hitherto consisted of the tilting screw before mentioned, the upper end of which has been universally jointed to the base of the body while the screw itself has extended through the central bore of a nut wheel and has engaged screw threads therein. The nut wheel has been carried by a frame, casing or the like, which latter has been capable of rocking in any direction required to enable the tilting screw to assume the requisite angle in accordance with the direction in which the body was to be tilted.

In such constructions however which have been generally known for many years, the nut wheel or its equivalent which was formed with peripheral teeth, shared the angular movements of the axis of the tilting screw, and consequently well known means, such as bevel gearing, worms or the like, through which the nut wheel was operated, also shared the angular motions of the tilting screw, and consequently the shaft or shafts by which such bevel or worm gearing was operated, likewise shared the angular motions of the tilting screw, and in some cases, in order to conveniently operate the mechanism, the operating shafts, which were frequently to be turned by hand, were universally jointed.

According to the present invention a tilting mechanism for self-discharging wagons of the kind specified comprises a gear case permanently fixed to the chassis of the vehicle beneath said tilting body of said wagon, annular bearings in said gear case, a horizontally arranged annular toothed worm wheel carried in said bearings, a nut within said annular wheel through which nut said tilting screw passes and engages, a universally jointed connection between said nut and said wheel, by which said nut is carried and caused to share the revolutions of said nut wheel and to permit said nut to have free angular adjustment, horizontal bearings fixed in said gear case, an operating shaft carried in said fixed bearings in said fixed gear case, a worm on said operating shaft to engage said annular toothed wheel, and means for revolving said operating shaft to raise and lower said tilting screw.

The construction therefore is such, that the nut is so connected to the nut wheel, that the tilting screw can assume any desired angle, while the nut shares the rotations of the nut wheel, and the latter is carried in stationary bearings in the fixed gear case. A further feature that attends this invention is that the operating shaft of the nut wheel can extend from the fixed gear case onto both sides of the chassis, or may extend longitudinally of the chassis, all in accordance with the position which it is desired the shaft shall have.

The universal joint, by which the nut is connected to the nut wheel so as to leave the tilting screw free to assume its required angular positions and at the same time to cause the nut to share the revolutions of the nut wheel, may be of any known construction.

The invention will be described with reference to the accompanying drawings, whereon Fig. 1 is a diagram plan view showing a portion of the chassis of a vehicle having the body removed and with the gear case fixed in a position to permit the operating shaft to extend laterally to each side of the chassis. Fig. 2 is a diagram elevation of a self-discharging wagon corresponding to Fig. 1. Fig. 3 is a diagram plan view showing a portion of the chassis of a wagon with the gear case fixed thereto and arranging for the operating shaft to extend longitudinally of the chassis. Fig. 4 is a part sectional elevation showing the gear case fixed to the framework of the chassis and carrying the various parts outlined above and hereafter more particularly described, and Fig. 5 is a sectional plan on the line X—Y of Fig. 4.

In the drawings, Figs. 1 and 2, the gear case 1 is shown fixed by way of example to cross bearers 2 of the chassis 3, and so arranged that the operating shaft 4 extends to both sides of the vehicle so that it is operable from either side by, for instance, a detachable handle 2* indicated by dotted lines, and said operating shaft 4 is further supported by passing through bearings 3* fixed in the chassis 3. The tilting screw 5 which passes through the gear case 1 is, as shown at Fig. 2, connected at its upper end to the base of the body of the wagon by any known joint such as 6. In such an instance as shown at Fig. 2, the upper end of the tilting screw 5 is connected to the body of the wagon by a universal joint 6 in cases where the body 7 of the wagon is mounted so as to be tilted or angularly adjusted relatively to the chassis, either to one side or the other, or forward or rearward, according to the direction in which the body is permitted to be tilted by its mounting and connection with the chassis as is well known, the diagram Fig. 2 indicating the body adapted to be tilted to one side or the other or rearwardly.

The operating shaft 4, as shown at Fig. 3, may be arranged longitudinally of the chassis 3 and may extend to the end of the vehicle where the shaft may be operated by a hand crank as previously mentioned; where the operating shaft is to be operated by power from the engine it is then particularly convenient to arrange the operating shaft longitudinally of the vehicle.

Figure 5:
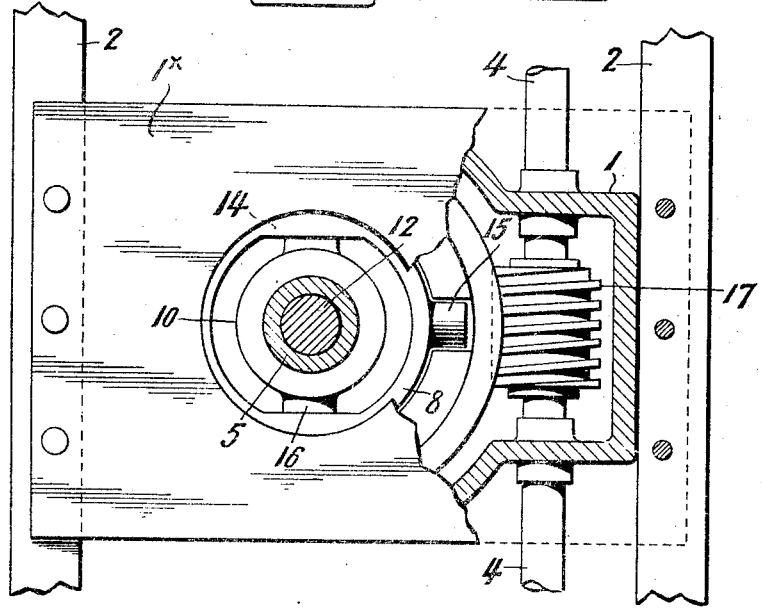

Referring now to Figs. 4 and 5 of the drawings, the gear case 1 is shown permanently fixed to and carried by bearers 2 forming part of the chassis. Within the gear case is located the horizontally arranged annular toothed worm wheel 8, supported upon fixed bearings 9, which in the example shown is composed of an annular ball bearing, so that the annular wheel 8 is freely revoluble and with little friction.

Within the annular wheel 8 is located a nut 10 through which passes the tilting screw 5 which engages with a thread in the nut 10 and carries at its upper end the member 6 by which it is jointed to the base of the wagon body. In the construction shown the tilting screw 5 is tubular and formed with an interior thread to receive an auxiliary screw 12, which latter carries the connection 6, so that when the tilting screw 5 has been advanced until the collar 13 on its end prevents further revolving motion, the auxiliary screw 12 will operate.

As aforesaid, the nut 10 is carried within the annular wheel 8 by any suitable or well known form of universal joint which will permit the axis of the nut 10 being rocked to any required angle in any direction and which will at the same time cause the nut 10 to be revolved with the annular wheel 8, and the drawings show a suitable and preferred form of such universal joint connection.

This universal joint connection comprises a ring 14 having diametrically opposite trunnions 15 which are carried in bearings formed in the annular wheel 8, and the nut 10 also is formed with diametrically opposite trunnions 16, the axis of which is at right angles to the axis of the trunnions 15, and the trunnions 16 of the nut 10 are carried in bearings formed in the ring 14. By this construction the nut 10 will always be caused to revolve with the annular wheel 8 and the said nut is free to rock to any required angle.

Also mounted in fixed bearings in the case 1 is the operating shaft 4 on which is fixed a worm 17 engaging the worm teeth on the external surface of the annular wheel 8.

The gear case 1 is formed with a central opening at its base, and the cover 1* of the gear case is also formed with a central opening in order to permit of the angular movements of the nut and the tilting screw. The operating shaft 4 is revolved, as aforesaid, by any suitable operating handle such as 2*, Fig. 1.

With such a construction it will be obvious that when the operating shaft 4 is revolved, the annular wheel 8 will also be revolved on its bearing and the nut 10 will share the revolutions of the wheel 8, and the upper end of the tilting screw being connected to the body of the vehicle, the said tilting screw will be extended or contracted according as the body of the wagon is tilted or lowered, and the tilting screw is at the same time free to assume any requisite angle. Moreover, the gear case 1 is always in a fixed stationary position relatively to the chassis of the vehicle, the annular wheel 8 has no other motion than revolution, and the operating shaft 4 also has no other motion than that of revolution.

What we claim as our invention and desire to secure by Letters Patent is:—

1. In tilting mechanism for self-discharging wagons of the kind specified and in which a tilting screw to tilt the body is universally jointed at its upper end to the base of the body and is raised or lowered by mechanism carried by the chassis of the vehicle; the combination of a gear case permanently fixed to the chassis of the vehicle beneath said tilting body of said wagon, a horizontal annular bearing in said gear case, an annular toothed worm-wheel carried in said bearing, a screw-threaded nut within said annular wheel through which nut said tilting screw passes and engages, a universally jointed connection between said nut and said wheel to carry said nut and cause it to share the revolutions of said worm wheel and to permit said nut and said tilting screw to have free angular adjustment, fixed horizontal bearings in said gear case, an operating shaft carried in said fixed bearings in said fixed gear case, a worm on said operating shaft to engage said annular toothed wheel, and means for revolving said operating shaft to raise or lower said tilting screw.

2. In tilting mechanism for self-discharging wagons of the kind specified and in which a tilting screw to tilt the body is universally jointed at its upper end to the base of the body and is raised or lowered by mechanism carried by the chassis of the vehicle; the combination of a gear case permanently fixed to the chassis of the vehicle beneath said tilting body of said wagon, a horizontal annular bearing in said gear case, an annular toothed worm-wheel carried in said bearing, a ring freely located within said annular worm wheel, diametrically opposite trunnions extending externally from said ring, bearings formed in said annular worm wheel to receive said trunnions, an internally screwthreaded nut within said annular worm wheel through which nut said tilting screw passes and engages, diametrically opposite trunnions extending externally from said nut, said ring having bearings diametrically opposite to the axis of its trunnions to receive and carry said trunnions of said nut, said gear case having a central opening at its base and a central opening in its top cover to permit of the free passage and movements of said nut and said tilting screw, fixed horizontal bearings in said gear case, an operating shaft carried in said fixed bearings in said fixed gear case, a worm on said operating shaft to engage said annular toothed wheel, and means for revolving said operating shaft to raise or lower said tilting screw.

In witness whereof we have hereunto set our hands.

WALTER BARNETT.
JAMES FLORENDINE.